US007502464B2

(12) United States Patent
Macchetti et al.

(10) Patent No.: US 7,502,464 B2
(45) Date of Patent: Mar. 10, 2009

(54) METHOD OF IMPLEMENTING ONE-TO-ONE BINARY FUNCTION AND RELATIVE HARDWARE DEVICE, ESPECIALLY FOR A RIJNDAEL S-BOX

(75) Inventors: Marco Macchetti, Lodi (IT);
Pasqualina Fragneto, Milan (IT);
Guido Marco Bertoni, Cusano Milanino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 657 days.

(21) Appl. No.: 10/816,791

(22) Filed: Apr. 2, 2004

(65) Prior Publication Data

US 2004/0228482 A1 Nov. 18, 2004

(30) Foreign Application Priority Data

Apr. 4, 2003 (EP) ................................. 03425211

(51) Int. Cl.
*H04L 9/00* (2006.01)
(52) U.S. Cl. .......................................... 380/37; 380/29
(58) Field of Classification Search .................. 380/29, 380/37
See application file for complete search history.

(56) References Cited

U.S. PATENT DOCUMENTS 4,275,265 A * 6/1981 Davida et al. ................. 380/29
5,710,731 A * 1/1998 Ciraula et al. ................ 708/706
6,243,470 B1 * 6/2001 Coppersmith et al. ........ 380/259

FOREIGN PATENT DOCUMENTS

WO  03/010919  2/2003

OTHER PUBLICATIONS

Morioka et al. An Optimized S-Box Circuit Architecture for Low Power AES Design, Cryptographic Hardware and Embedded Systems—Ches 2002. 4th International Workshop Revised Papers (Lecture Notes inComputer Science vol. 2523), pp. 172-186, XP002254730.*
"Logic and Computer Design Fundamentals. Chapter 4—Combinational Functions and Circuits." 2004. Pearson Education. Slides 9-11. http://faculty.ksu.edu.sa/drfiras/discrete%20tutorials/LCDF3_Chap_04.ppt.*
Ehrsam et al., Key Controlled Substitution for Cryptographic Applications, Mar. 1978, IBM Technical Disclosure Bulletin, vol. 20, No. 10, Mar. 1, 1978, pp. 3984-3985, XP002254729.

(Continued)

*Primary Examiner*—Gilberto Barron, Jr.
*Assistant Examiner*—Martin Jeriko P San Juan
(74) *Attorney, Agent, or Firm*—Lisa K. Jorgenson; Allen, Dyer, Doppelt, Milbrath & Gilchrist, P.A.

(57) ABSTRACT

A method for implementing one-to-one binary functions defined on the Galois field $GF(2^8)$ is very useful for forming fast and low power hardware devices regardless of the binary function. The method includes decoding an input byte for generating at least one bit string that contains only one active bit, and logically combining the bits of the bit string according to the binary function for generating a 256-bit string representing a corresponding output byte. The 256-bit string is then encoded in a byte for obtaining the output byte.

15 Claims, 4 Drawing Sheets

OTHER PUBLICATIONS

Morioka et al., A 10 Gbps Full-AES Crypto Design with a Twisted-BDD S-Box Architecture, Proceedings 2002 IEEE International Conference on Computer Design: VLSI in Computers and Processors, 2002 IEEE International Conference on Computer Design, Freiberg, Germany, Sep. 16-18, 2002, pp. 98-103, XP008021504.

Morioka et al., An Optimized S-Box Circuit Architecture for Low Power AES Design, Cryptographic Hardware and Embedded Systems—Ches 2002. 4th International Workshop Revised Papers (Lecture Notes in Computer Science vol. 2523, pp. 172-186, XP002254730.

Wolkerstorfer et al., An ASIC Implementation of the AES SBoxes, Topics in Cryptology—CT-RSA 2002. Cryptographers' Track at the RSA Conference 2002. Proceedings (Lecture Notes in Computer Science vol. 2271), pp. 67-78, XP002254731.

* cited by examiner

METHOD OF IMPLEMENTING ONE-TO-ONE BINARY FUNCTION AND RELATIVE HARDWARE DEVICE, ESPECIALLY FOR A RIJNDAEL S-BOX

FIELD OF THE INVENTION

The present invention relates to implementing a one-to-one binary function that is particularly suited for forming S-box devices performing the ByteSub operation of the Rijndael AES encryption/decryption algorithm.

BACKGROUND OF THE INVENTION

In devices implementing encryption/decryption algorithms it is necessary to perform binary functions over an input set of bytes to be encrypted/decrypted for generating corresponding output bytes. These operations include a one-to-one binary function that is implemented by logic circuitry. This logic circuitry is required to be fast, consume low power and occupy a small silicon area.

Because of the importance of the Rijndael AES encryption/decryption algorithm, the problem to be addressed is presented with respect to this algorithm, but the same considerations hold also for any binary one-to-one function.

A brief overview of AES will now be provided. In Jan. 2, 1997, the National Institute of Standards and Technology (NIST) announced the beginning of the development of the Advanced Encryption Standard (AES). The overall goal was to develop a Federal Information Processing Standard (FIPS) that specified an encryption algorithm capable of protecting sensitive (unclassified) government information into the twenty-first century.

The formal call for algorithms was made on Sep. 12, 1997. The algorithms were required to implement symmetric key cryptography as a block cipher and to support a block size of 128 bits, and key sizes of 128, 192 and 256 bits. In Aug. 20, 1998, NIST announced fifteen AES candidate algorithms at the First AES Candidate Conference, and solicited public comments on the candidates. A Second AES Candidate Conference was held in March 1999 to discuss the results of the analysis that was conducted by the international cryptographic community on the candidate algorithms. In August 1999, NIST announced its selection of five finalist algorithms from the fifteen candidates. The selected algorithms were MARS, RC6, Rijndael, Serpent and Twofish.

A lot of attention had been put on the complexity of the algorithms. A good AES algorithm was required to be easily implemented on general purpose processors and on reconfigurable hardware, and light from a computational point of view.

NIST judged the Rijndael algorithm to be the best algorithm for the AES at the end of a very long and complex evaluation process in which all public comments, papers, verbal comments at conferences, NIST studies and reports had been analyzed. The official announcement was made on Oct. 2, 2000 and the standard was completed with the publication of FIPS-197 [1] on Nov. 26, 2001.

Many ways of forming devices for implementing efficiently the Rijndael AES encryption/decryption algorithm have been investigated. Papers (see for instance [2, 3]) that describe implementations of the AES algorithm on field programmable gate arrays (FPGAs) are present in the technical literature. Few of them (see [4]) describe an implementation of the Rijndael algorithm on application specific integrated circuit (ASIC) platforms.

A custom but still flexible implementation, however, would be desirable in high speed or embedded dedicated cores in which fast and/or low-power computation is desirable. The consumed silicon area for forming an electronic circuit that performs the steps of the Rijndael algorithm is an important parameter for custom implementations. The smaller the consumed area, the lower the unit cost, and thus the higher the number of hardware devices produced on the same silicon die.

It has been observed [5] that the realization of the so-called S-box, which is a hardware device that performs the byte substitution operation (ByteSub) contemplated by the algorithm, is critical for reducing the area consumption. This operation is the bottle neck of the algorithm because it must be repeated many times and it is implemented by a one-to-one nonlinear binary function. Moreover, given that this function is nonlinear, it is not possible to form a hardware device for performing it by using standard synthesis techniques.

The ByteSub operation is a composition of two binary functions defined on bytes. The first function is an inversion in the finite field (or Galois Field) $GF(2^8)$, which is a field composed of bytes, while the second is an affine function. Optimum security properties are obtained for the entire cipher system by combining in cascade these two functions (see for instance [6] and [7]).

The first function is more complex than the second from a computational point of view because it behaves almost like a purely random function. For this reason, the S-box is generally synthesized starting from the complete truth table of the function. A behavioral table-like description is provided to a VHDL compiler, and the corresponding combinatorial function is extracted and synthesized with logic gates.

An alternative approach includes considering the ByteSub operation as a function defined on the composite finite field $GF((2^4)^2)$. The input byte is separated into two nibbles and the problem of inverting the first function is reduced to the problem of inverting a function in the inner field $GF(2^4)$ which is smaller. This method has been originally proposed by Rijmen in [8], and further developed in [9]. See also [10], that contains performance estimations of the obtained circuit when implemented by the HCCMOS7 technology library of STMicroelectronics. A further study on the optimization of the S-box has been proposed in [11], mainly addressing speed issues.

Another important issue in custom implementations is power consumption. Although many techniques are described in technical literature for reducing power consumption at the transistor level and at higher levels, still a handmade analysis and design is often useful to produce low power custom units. Synthesis tools have features for power optimization, but still most of the power can be saved by human analysis and by giving the VHDL compiler a good starting point.

Moreover, power optimization is often in contradiction with other design goals, such as a small chip area and high speed, high frequency operation. A low power approach for designing the Rijndael S-box is discussed in [12]. The authors start from the compact implementation discussed in [8], exploit a positive polarity reed-muller (PPRM) technique, and add delay chains to reduce power consumption and glitches of the architecture.

SUMMARY OF THE INVENTION

In view of the foregoing background, an object of the invention is to provide a method for implementing one-to-one binary functions defined on the Galois field $GF(2^8)$. This method is very useful for forming fast and low power hardware devices regardless of the binary function. In particular, the method of the invention is particularly suited for forming electronic circuits that implement the Rijndael encryption/decryption algorithm.

More precisely, the method generates output bytes corresponding to respective input bytes according to a one-to-one binary function, comprising the steps of decoding an input byte generating at least a bit string that contains only one active bit, logically combining the bits of the bit string according to the binary function for generating a 256-bit string representing a corresponding output byte, and encoding the 256-bit string in a byte for obtaining the output byte.

This method may be implemented by a fast and small area consuming hardware device for generating output bytes corresponding to respective input bytes according to a one-to-one binary function. The hardware device may comprise a decoder of the input byte for generating at least a bit string that contains only one active bit. An array of logic gates may be input with the bit string for generating a 256-bit string by logically combining the bits of the input string according to the one-to-one binary function. An encoder may be input with the 256-bit string for generating the output byte.

BRIEF DESCRIPTION OF THE DRAWINGS

The different aspects and advantages of the invention will appear even more evident through a detailed description referring to the attached drawings, wherein.

DETAILED DESCRIPTION OF THE PREFERRED EMBODIMENTS

In the ensuing description, the method of the invention is described while referring to the AES S-box as an example. However, what is stated below does not depend exclusively on the particular binary functions of the Rijndael algorithm. In contrast, the method can be immediately extended to any one-to-one binary function. This method also includes variations that achieve different levels of efficiency. They are all listed in order, starting from the simplest to the most sophisticated one.

As discussed above, a careful analysis of a Boolean function to be implemented often leads to high power savings. The analysis can be made automatically by design tools, or by the designer himself at a high level of complexity. The S-box implements a nonlinear byte substitution function that has good statistical properties. The input-output correlation is kept as low as possible and the function is very similar to a random function.

Recently, an analysis that sheds some doubt on the designers' claim for robustness of the nonlinear part has been published (see [13]). Moreover, there is no evidence that this result can be useful for area or power reduction in hardware designs, although it can be a good starting point for a cryptanalytic attack of the cipher algorithm it is contained in.

The ByteSub operation performed by the S-box is nothing but a permutation of all the elements of the Galois finite field $GF(2^8)$, i.e., it is a byte permutation. Hence, this operation is a one-to-one mapping.

Figure 1:
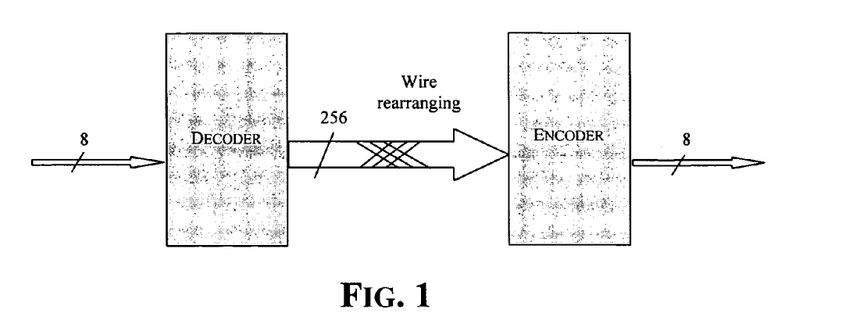
FIG. 1 depicts an embodiment of the hardware device of the invention.

Therefore, instead of computing the input-output function in a standard way, according to the invention, it is possible to do it by decoding the input byte for generating at least a bit string containing only 1 active bit, for example a 256-bit string or two 16-bit strings, then rearranging the bits according to the one-to-one binary function for obtaining a 256-bit string, as depicted in FIG. 1. This may be done without any power dissipation. Finally, the output byte is obtained by encoding back to a byte the 256-bit string obtained after having changed the order of the bits. Note that the rearrangement of the wires is not strictly necessary, because the same result may be obtained by using an array of logic gates generating the bits of the 256-bit input it in the encoder.

The decoder may be designed using AND and inverter logic gates, which are present in the technology library. Different options are available. One approach includes designing it as a single binary tree using only two-inputs AND cells, as in FIG. 2. Note that each input bit wire must be available in normal and complemented form and it enables a single sub-tree. The number of AND logic gates that are switching when the input sequence changes is at most 14 because the worst case occurs when the two decoded lines belong to two different sub-trees. In this case 7 gates switch off and 7 gates switch on. The maximum number of inverter gates that may switch is 8.

Figure 2:
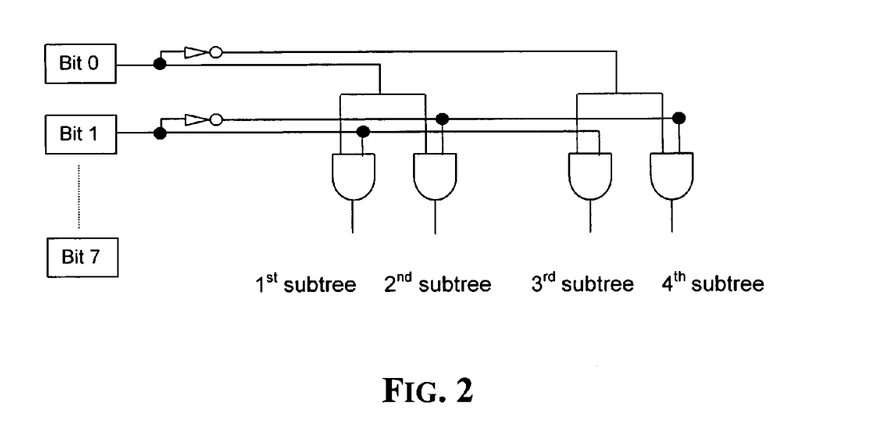
FIG. 2 illustrates a straightforward architecture of the decoder of FIG. 1.

The drawback of this implementation is that power consumption is highly affected by high net fan-outs and the input bit wires, and must face an increasing fan-out as they are closer to the output of the decoder. For instance, bit 0 and 1 have a fan-out of only 4 AND gates, while bit 7 has a fan-out of 256 AND gates (one half of them pertaining to the normal form and the other half to the complemented form).

Another approach includes providing a single level of 256 eight-inputs AND components, one per each decoded line. This approach is faster, but each input line has a fan-out of 256 gates. Latency is only that of one eight-input AND gate, which is normally faster than 6 cascaded two-inputs AND gates. In this case just 2 AND gates are switching when the input sequence changes.

Figure 3:
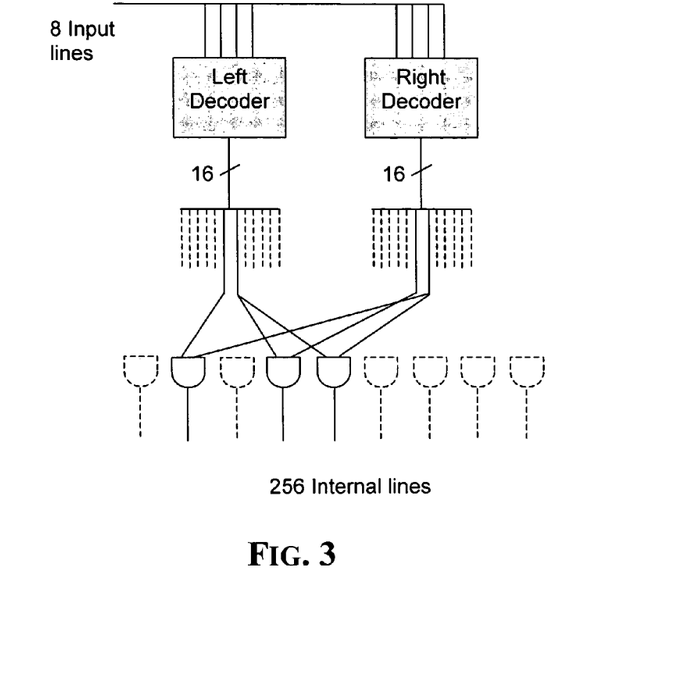
FIG. 3 illustrates the preferred embodiment of the hardware device of the invention.

The preferred approach includes forming a hardware device for implementing a one-to-one binary function with a two-level architecture, as shown in FIG. 3. The left decoder block and the right decoder block have the same internal structure. Their task is decoding the most (left) and the least significant (right) nibbles of the input byte, respectively, and generating respective left and right 16-bit strings each having only one active byte by decoding the input nibble.

An array of 256 two inputs AND gates is provided and is input with bits of the 16-bit strings. Each AND gate is connected to a unique combination of the left and right decoder output lines. For instance, consider the internal line representing the Galois field element 0x63 (i.e., the byte 0x63). This line is connected to the output of the AND gate, which in turn is connected to the $7^{th}$ output line from the left decoder and to the 4$^{th}$ output line of the right decoder. This internal line is active only when the left decoder receives the value '6' and switches active its 7$^{th}$ output line, and when the right decoder receives the value '3' and switches active its 4$^{th}$ output line.

Given that the inputs of S-box may be considered random distributed byte values, it holds that each of the left and right decoder input lines has a switching probability of 1/2 over a long operating period. Each of the 16 left and right decoder output lines has a switching probability of 1/16 over a long operating period, and each of the 256 internal lines has a switching probability of 1/256 over a long working period.

Figure 4:
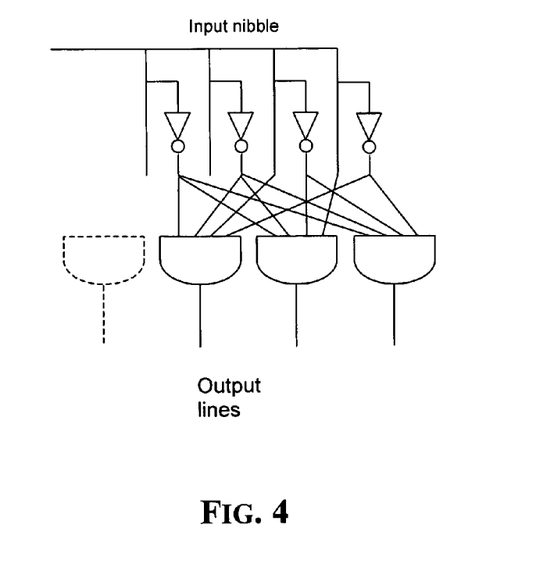
FIG. 4 shows a detailed view of the left and right decoders of FIG. 3.

The internal structure of the left and right decoders is represented in FIG. 4. This is a normal architecture for a priority-less decoder. An immediate advantage of the proposed architecture is that the maximum fan-out of nets is fixed to 16 gates, i.e., keeping low the fan-out of the nets leads to a low power consumption. Another advantage is that the latency of the decoder is equal to the latency of only one inverter gate and of two AND gates.

The encoder component is more area consuming and brings more switching activity to the global circuit. Preferably, it is formed only of OR gates. Every encoder output line is a logic OR between exactly 128 internal lines. For each output bit, the OR-tree is practically implemented by 3 levels of components. The first level is made of 16 eight-inputs OR gates, the second level is made of 2 eight-inputs OR gates, and the third level which provides the output bit is just a two-input OR gate.

Such an architecture is commonly used for encoders. Although it is quite area consuming since the encoder has 256 input lines, it can be very fast because the latency is equal to that of 2 eight-input OR gates and 1 two-input OR gate. Moreover, the maximum number of switching gates consequent to a switching input line is fixed at 16 eight-inputs OR gates and at 8 two-inputs OR gates. This corresponds to the worst case when all the 8 output lines are switching at the same time. The maximum fan-out of the encoder is 8, and specifically it is the fan-out of the input line (1 out of 256) in correspondence of active bits of the output byte.

The hardware device of the invention may be used for forming an S-box device for the Rijndael algorithm making the implemented one-to-one binary function be the function representing the ByteSub operation. Performances of a Decode-Encode (D&E) AES S-box architecture formed according to the scheme of FIG. 3 starting from VHDL files will now be discussed. In this way, the validity of the proposed method for the efficient synthesis of one-to-one combinatorial networks is demonstrated.

Figure 5:
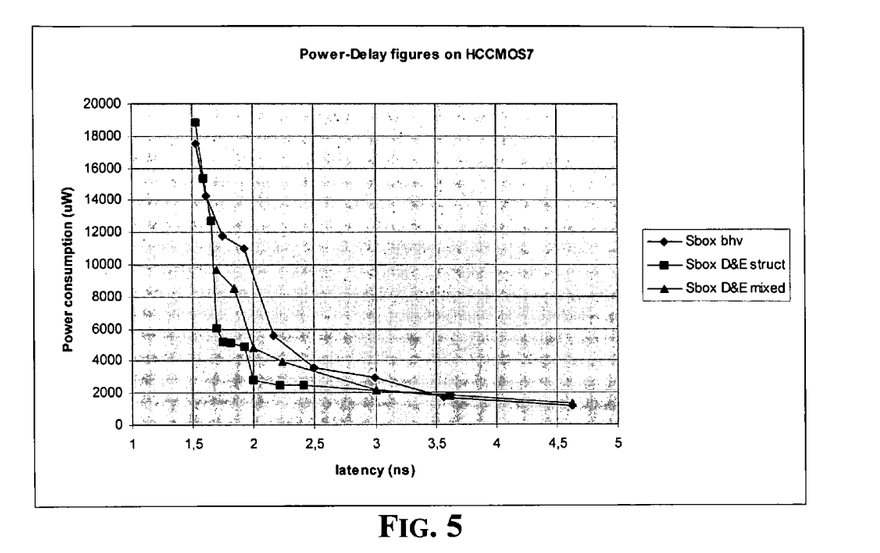
FIG. 5 compares power-delay performances of different AES S-box architectures with that of the S-box of the invention.

The synthesis of the AES S-box has been carried out using the design tool Synopsis Design Compiler, version 2001.08, and the HCCMOS7 (by STMicroelectronics) technology library featuring a 0.25 µm process operating at 1.8 V core voltage. FIG. 5 depicts power-delay diagrams from a purely behavioral description (S-box bhv), a mixed structure (S-box D&E mixed) and a structural decode-encode description (S-box D&E struct).

The purely behavioral description (S-box bhv) is where the S-box truth table is simply given to the design tool. This description is useful to test the compiler's capability of optimizing the circuit with built-in techniques. Note that the VHDL code would be the same in case a ROM was present. However, for relatively small structures like the S-box, the ROM table is often allocated as a combinational logic and optimized by the silicon compiler.

The mixed structure (S-box D&E mixed) is where the decode-encode structure is explicitly given to the compiler, but the decoder and the encoder blocks are described in a behavioral mode. This description may be useful to test the capability of the compiler of using logic blocks inside the specific technology library to map these circuits.

The structural decode-encode description (S-box D&E struct) is where the architecture described above is explicitly given to the compiler (VHDL is written with a structural approach). The simplest components, such as AND and OR gates, are described in behavioral code and form the basis for the structural description.

The proposed decode-encode S-box architecture (S-box D&E struct) behaves very well in the region between 1.6 ns and 3 ns time latency. Power consumption in this region is about 50% smaller than the power consumption of the S-box obtained with a purely behavioral description. Both architectures can reach a speed limit of 1.53 ns using this specific technology library, but the proposed architecture is not worthy at full speed. It is interesting to note that the compiler is not able to map automatically fast power-efficient encoders and decoders, as can be seen from the D&E mixed line. The performances of this architecture are better than those obtained with the purely behavioral approach, and this can be seen as a partial benefit of the decode-encode structure.

Figure 6:
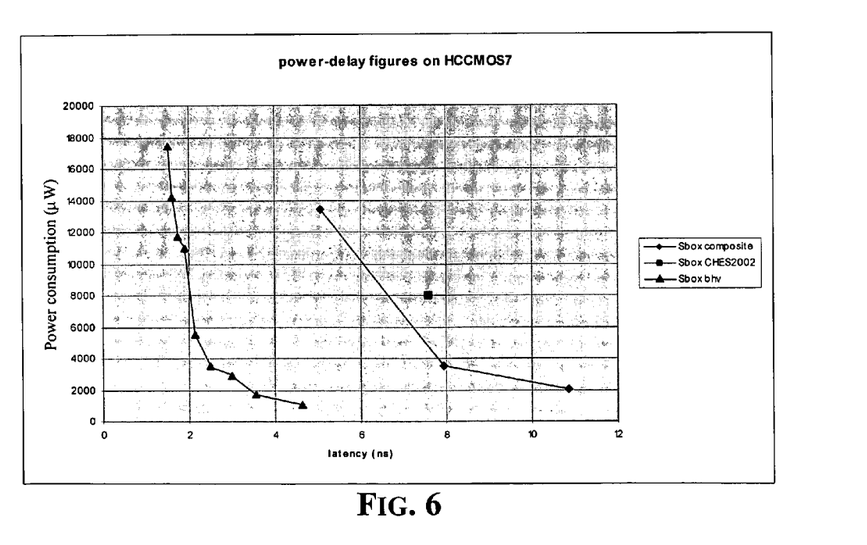
FIG. 6 compares power-delay performances for different composite field AES S-box architectures of the invention.

The composite fields architecture has been coded as well, and the power delay figures are reported in FIG. 6, together with a single mapping from the CHES2002 low-power implementation, which is basically a modification of the composite fields architecture. In the latter case it was not possible to model delay chains with the HCCMOS library, which are an essential part of the architecture. Results are expected to be better than the standard composite field case when delay chains are correctly modeled. This is true for power consumption, but delays will be very similar. As may be noticed from the graph, power-delay figures are worse for the composite fields architecture, which by contrast, is a convenient architecture as far the area occupation is concerned.

Figure 7:
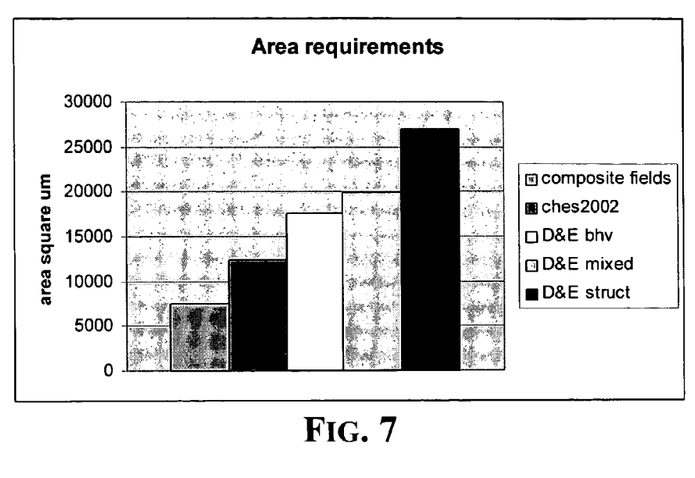
FIG. 7 compares silicon area requirements of different AES S-box architectures of the invention.

FIG. 7 compares minimum area occupation figures for the different S-box architectures. To prove the general validity of the method of the invention for implementing any one-to-one binary function, other cases are examined. If the values of the function implemented by the AES S-box have to be changed for security reasons, it is sufficient to change the arrangement of the internal lines of the S-box of the bit strings obtained by decoding the input byte without increasing the power consumption.

Another possibility includes inserting multiplexers in the inner switch to support the direct and inverse ByteSub simply with an additional control line. This will lead to important area savings, given that encryption and decryption operations are not used at the same time.

It is possible to optimize the S-boxes of other different cryptographic algorithms as well. The decode-encode" scheme is still applicable for any hardware device implementing an one-to-one binary function. For instance, the method of the invention may be applied to the DES (Data Encryption Standard) algorithm [14], as well as to the Kasumi algorithm [15], which is the candidate encryption algorithm for the new UMTS infrastructure.

Figure 8:
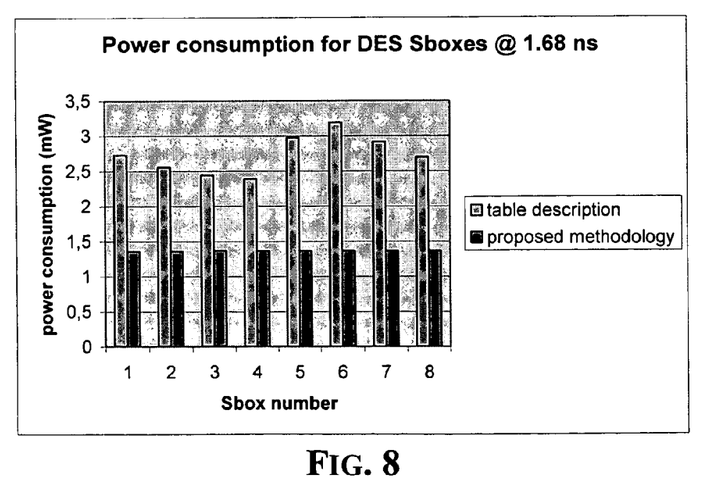
FIG. 8 compares the power consumption of the eight S-boxes implementing the DES algorithm formed according to the method of the invention and with a table description technique.

FIG. 8 shows the power consumption figures of the eight S-boxes for performing the DES algorithm. These components have been synthesized, first starting from a table description and then by the proposed method. The power saving is evident, and a further unexpected but favorable result includes that the eight S-boxes dissipate substantially the same power because they differ only in the way the wires are permuted. This is an important feature, because it allows "hot spots" to be eliminated in the design and allows a more regular power consumption of the whole circuit.

REFERENCES

[1] "Announcing the ADVANCED ENCRYPTION STANDARD (AES)"—Federal Information Processing Standard Publication 197, 2001.
[2] M. McLoone and J. V. McCanny, "*High performance single-chip FPGA Rijndael algorithm*", Proceedings of CHES 2001.
[3] V. Fischer and M. Drutarovsky, "*Two methods of Rijndael implementation in reconfigurable hardware*", Proceedings of CHES 2001.
[4] H. Kuo and I. Verbauwhede, "*Architectural optimization for a 1.82 Gbits/sec VLSI implementation of the AES Rijndael algorithm*", Proceedings of CHES 2001.
[5] P. R. Shaumont, H. Kuo, I. Verbauwhede, "*Unlocking the Design Secrets of a 2.29 Gb/s Rijndael Processor*", Proceedings of DAC 2002.
[6] K. Nyberg, "*Differentially uniform mappings for cryptography*", Proceedings of EUROCRYPT 1993
[7] J. Daemen, V. Rijmen, "*AES Proposal: Rijndael*", 1999.
[8] V. Rijmen, "*Efficient Implementation of the Rijndael S-BOX*".
[9] A. Rudra, P. K. Dubey, C. S. Jutla, V. Kumar, J. R. Rao, P. Rohatgi, "*Efficient Rijndael Encryption Implementation with Composite Field Arithmetic*", Proceedings of CHES 2001.
[10] M. Macchetti, G. Bertoni, "*Hardware Implementation of the Rijndael Sbox: a Case Study*", to appear in the ST Journal of System Design.
[11] S. Morioka and A. Satoh, "*A* 10 *Gbps Full-AES Crypto Design with a Twisted-BDD S-BOX Architecture*", Proceedings of ICCD 2002.
[12] S. Morioka and A. Satoh, "*An Optimized S-box circuit architecture for low power AES design*", Proceedings of CHES 2002.
[13] J. Fuller and W. Millan, "*On Linear Redundancy in the AES SBOX*", 2002.
[14] "Data Encryption Standard", FIPS PUB 46-1, 1988.
[15] Website: www.3gpp.org.

That which is claimed is:

1. A method for generating output bytes corresponding to respective input bytes according to a one-to-one binary function representing a cryptographic algorithm, the method comprising:
   decoding an input byte and generating at least one bit string that contains only one active bit, with the decoding comprising subdividing the input byte into a left nibble and a right nibble, and decoding the left nibble and right nibble into a left 16-bit string and a right 16-bit string, respectively, each 16-bit string containing only one active bit;
   using an array of logic gates for logically combining the 16-bit strings according to the one-to-one binary function and generating an encrypted 256-bit string without the use of a lookup table; and
   encoding the encrypted 256-bit string for obtaining an output byte for the cryptographic algorithm.

2. A method according to claim 1, wherein the one-to-one binary function represents a ByteSub operation of a Rijndael AES encryption/decryption algorithm.

3. A method according to claim 1, wherein the array of logic gates comprise AND gates, with each bit of the 256-bit string being obtained by ANDing among the bits of the 16-bit strings.

4. A method for implementing a cryptographic algorithm comprising:
   decoding an input byte and generating at least one bit string that contains at least one active bit, with the decoding comprising subdividing the input byte into a left nibble and a right nibble, and decoding the left nibble and right nibble into a left string and a right string, respectively, each string containing only one active bit;
   using an array of logic gates for logically combining the bit strings according to the one-to-one binary function and generating an encrypted bit string without the use of a lookup table; and
   encoding encrypted the bit string for obtaining an output byte for the cryptographic algorithm.

5. A method according to claim 4, wherein the cryptographic algorithm comprises a Rijndael AES encryption/decryption algorithm.

6. A method according to claim 5, wherein the one-to-one binary function represents a ByteSub operation in the Rijndael AES encryption/decryption algorithm.

7. A method according to claim 4, wherein the array of logic gates comprises AND gates, with each bit of the bit string is obtained by ANDing among the bits of the 16-bit strings.

8. A device for implementing a cryptographic algorithm, the device comprising:
   a decoder for decoding an input byte and generating at least one bit string that contains only one active bit, said decoder comprising a left decoder being input with a left nibble of the input byte and a right decoder being input with a right nibble of the input byte, and decoding the left nibble and right nibble into a left 16-bit string and a right 16-bit string, respectively, each 16-bit string containing only one active bit;
   an array of logic gates being input with the 16-bit strings, and generating an encrypted 256-bit string without the use of a lookup table by logically combining the 16-bit strings according to the one-to-one binary function; and
   an encoder being input with the encrypted 256-bit string and generating an output byte for the cryptographic algorithm.

9. A device according to claim 8, wherein said array of logic gates comprises an array of 256 AND gates, each AND gate generating a respective bit of the encrypted 256-bit string by ANDing bits of the 16-bit strings.

10. A device according to claim 8, further comprising:
    an array of multiplexers each being input with bits of the 16-bit strings and being driven by selection signals, and generating a respective intermediate bit being fed to said array of logic gates; and
    said array of logic gates generating bits of the encrypted 256-bit string by logically combining the intermediate bits.

11. A cryptographic device for implementing a cryptographic algorithm, the cryptographic device comprising:
    a decoder for decoding an input byte and generating at least one bit string that contains only one active bit, said decoder comprising a left decoder being input with a left nibble of the input byte and a right decoder being input with a right nibble of the input byte, and decoding the left nibble and right nibble into a left 16-bit string and a right 16-bit string, respectively, each 16-bit string containing only one active bit;
    an array of logic gates being input with the 16 -bit strings, and generating an encrypted 256-bit string without the use of a lookup table by logically combining the 16-bit strings according to a one-to-one binary function; and
    an encoder being input with the encrypted 256-bit string and generating an output byte for the cryptographic algorithm.

12. A cryptographic device according to claim 11, wherein the cryptographic algorithm comprises a Rijndael AES encryption/decryption algorithm.

13. A cryptographic device according to claim 12, wherein the one-to-one function corresponds to a Bytesub operation within the Rijndael ABS encryption/decryption algorithm.

14. A cryptographic device according to claim 11, wherein said array of logic gates comprises an array of 256 AND gates, each AND gate generating a respective bit of the encrypted 256-bit string by ANDing bits of the 16-bit strings.

15. A cryptographic device according to claim 11, further comprising:
- an array of multiplexers each being input with bits of the 16-bit strings and being driven by selection signals, and generating a respective intermediate bit being fed to said array of logic gates; and
- said array of logic gates generating bits of the encrypted 256-bit string by logically combining the intermediate bits.

* * * * *

UNITED STATES PATENT AND TRADEMARK OFFICE
CERTIFICATE OF CORRECTION

PATENT NO.        : 7,502,464 B2                                          Page 1 of 1
APPLICATION NO.   : 10/816791
DATED             : March 10, 2009
INVENTOR(S)       : Marco Macchetti, Pasqualina Fragneto and Guido Marco Bertoni It is certified that error appears in the above-identified patent and that said Letters Patent is hereby corrected as shown below:

| | |
|---|---|
| Column 8, Line 9 | Delete: "encrypted the" |
| Claim 4 | Insert: --the encrypted-- |
| | |
| Column 8, Line 19 | Delete: "string is" |
| Claim 7 | Insert: --string being-- |

Signed and Sealed this

First Day of June, 2010

David J. Kappos
*Director of the United States Patent and Trademark Office*